Jan. 19, 1971  H. DILCHERT  3,555,825
DUAL SOLID FUEL PROPELLANT ROCKET ENGINE
Filed Jan. 16, 1969
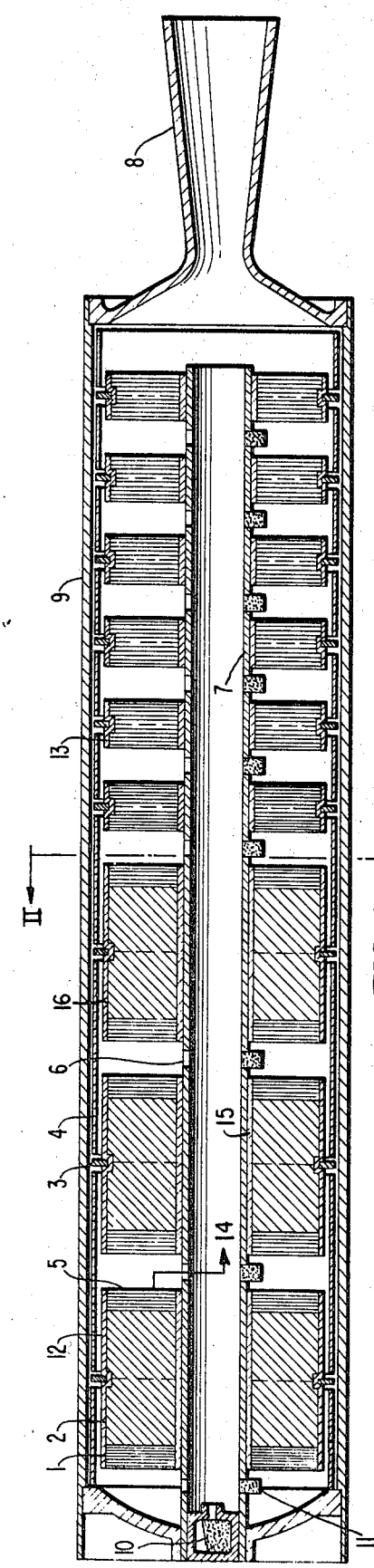
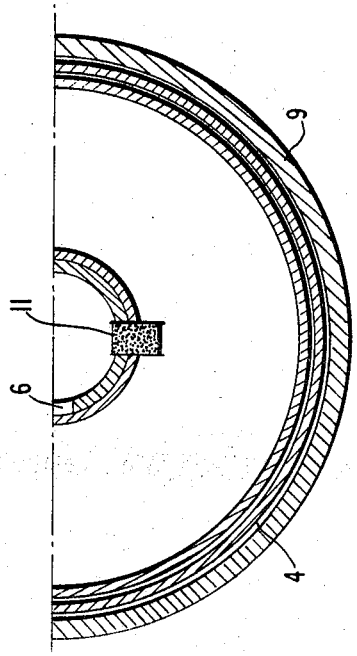
INVENTOR
HEINZ DILCHERT
BY
ATTORNEYS United States Patent Office 3,555,825
Patented Jan. 19, 1971

3,555,825
DUAL SOLID FUEL PROPELLANT
ROCKET ENGINE
Heinz Dilchert, Steyerberg, Germany, assignor to Dynamit Nobel Aktiengesellschaft, Troisdorf, Germany
Filed Jan. 16, 1969, Ser. No. 791,692
Claims priority, application Germany, Jan. 16, 1968,
1,626,079
Int. Cl. F02k 9/06
U.S. Cl. 60—250
17 Claims

ABSTRACT OF THE DISCLOSURE

The engine is provided with a plurality of propellant charges, some of which have booster propellant defining their total burning surface and sustaining propellant, where others have only booster propellant. The charges are annular to surround a central tube having radial apertures communicating with the burning surfaces for conducting the exhaust centrally to a common nozzle means for accommodating the ignition boosters to transfer the ignition from a central ignition charge located at the end of the tube opposite from the nozzle means. Preferably the charges having both booster and sustainer propellant are identical and the charges having only booster propellant are identical, with each having a central band mounted between adjacent thin wall tubes along the interior surface of the combustion chamber for determining the axial uniform spacing of the charges. The charges preferably have means insulating their annular inner and outer cylindrical surfaces so that they are dual axially spaced end burners.

BACKGROUND AND SUMMARY OF THE INVENTION

Guided missiles are ordinarily designed in such a manner that a high thrust take-off stage provides the required flight velocity, and an adjacent low thrust sustainer stage maintains the flight velocity until the target is reached. It is desirable to construct slim missiles, that is, with a diameter as small as possible, because of the improved flight characteristics and small drag.

With conventional propellant charges, for example, internal burner grains, tubular burner grains, etc., there is a considerable disadvantage that the burning time is very short for a small diameter of the propulsion unit; for this reason, it is desirable to construct the solid propellant rocket engine as a unit with a common nozzle or nozzle grouping wherein the second stage is ignited by the first stage immediately prior to the cutoff of the first stage, without dropping the burnt-out first stage. In this connection, thrust ratios of 10 to 1, and for the sustainer stage, burning times of 60 seconds and more are required. The thrusts of the sustainer stage are to be sufficient, even with relatively heavy missiles, to maintain velocity for the required flight maneuvers and execute them in a flawless manner.

Since propellants known at the present time permit only a K-ratio within the range of about 170 to 650, a thrust ratio of 10 to 1 cannot be obtained, when employing a common nozzle, solely by a burning area ratio of 10 to 1. By eliminating the threshold values for the K-ratio, a K-ratio of about 600 is preferably selected for the take-off or booster stage, and a K-ratio of about 200 is selected for the sustainer stage. Accordingly, a burning area ratio of about 3 to 1 is obtained between the booster stage and the sustainer stage. With respect to the desired thrust ratio of 10 to 1, the remaining portion of this ratio may be obtained by selecting propellants having different burning rates and is $$\frac{10:1}{3:1} = 3.33:1$$

Considering the different densities of the propellants and their specific impulses, a ratio of specific thrusts of 3.33 to 1 is ordinarily obtained with a burning rate ratio of 3 to 1. For purposes of comparison, specific values will be given to the burning rates; for example, a burning rate of 21 mm. per second may be selected for the take-off booster stage and a burning rate of 7 mm. per second for the sustainer stage. With such a selection of the burning rates, and the assumption of a take-off stage burning time of 4 seconds with a sustainer stage burning time of 60 seconds, there results a total fuel combustion travel of 4×21+60×7=504 mm.

It is an object of the present invention to provide a rocket propulsion unit satisfying the above requirements. This objective is obtained by providing a dual solid fuel propellant rocket engine having a plurality of propellant charges axially spaced in the combustion chamber for cooperation with a common nozzle or group of nozzles, which charges are dual end burners burning on both sides with a layer of sustainer propellant disposed between two layers of booster or take-off propellant and end burners burning on both sides made up of only booster propellant. By appropriately dimensioning and determining the number of dual propellant burners and single propellant burners, as well as by selection of the type of propellants for their burning rates, it is possible in a relatively simple manner to meet very difficult and quite different requirements.

According to further advantageous features of the present invention it is desirable to form the individual propellant charges as annular-cylindrical elements insulated on their inside and outside cylindrical surfaces. It is desirable to provide individual mountings for the charges within the combustion chamber. Desirable results are obtained by providing a central tube for mounting thereon the annular-cylindrical charges, which tube is open at one end with the nozzle means and has a plurality of radial apertures providing communication between its interior and the burning end faces of the propellant charges, so that by way of the apertures and the tube the propellant gases produced by all of the propellant charges may flow through the tube to the common nozzle or common group of nozzles and exit therefrom. The construction of the tube also provides for a simple ignition of the individual propellant charges, by inserting ignition boosters in the apertures for association with respective burner surfaces, or into additional apertures; these ignition boosters will be ignited by a common ignition charge disposed advantageously at the end of the tube opposite from the nozzle end. It is especially advantageous to mount all of the individual propellant charges or grains at equal axial spaces from one another, because thereby the same conditions are always obtained in the spaces between respective adjacent propellant charges. With such an arrangement, it is especially desirable to arrange all of the dual fuel burners successively at one end of the tube and all of the single fuel burners successively at the other end of the tube. For uniformity and performance as mentioned above and additionally for manufacturing technology reasons, it is advantageous to provide all separate propellant charge grains with the same cross sectional dimensions, and moreover, to make the dual fuel burners and the single fuel burners respectively identical among themselves.

In a conventional manner, it is desirable to provide the joining surfaces between the booster propellant and the sustainer propellant with a transition intermixing or transition propellant for the purpose of obtaining a gradual transition of the combustion over a predetermined interval of time between the booster propellant and the sustainer propellant; with this in mind, it can generally be stated that the individual charges contain only booster propellant and sustainer propellant.

DRAWING

Further objects, features and advantages of the present invention will become more clear from the following detailed description accompanying the attached drawing, wherein:

FIG. 1 is an axial cross-sectional view taken through a dual fuel propulsion unit employing the advantageous features of the present invention; and FIG. 2 is a partial cross-sectional view taken along line II—II of the FIG. 1 unit.

DETAILED DESCRIPTION OF THE INVENTION

As shown in FIG. 1, the combustion chamber 9 is provided with a nozzle 8 at the rear end, toward the front end with a plurality of dual fuel burners 12 formed as blocks of sustainer propellant 2 sandwiched between externally provided layers of booster propellant 1, and toward the rear end with single fuel burners 13 consisting only of booster propellant 1.

Each of the propellant charges is provided at its middle with a securely attached supporting annular ring or band axially fixed in position between adjacent thin wall spacer tubes 4. Thus, two adjacent propellant charges are disposed with their burning surfaces 5 facing each other, and with the central tube 7 extending through the propellant charges 12, 13 and provided with apertures 6 providing communication between the interior of the tube 7 and the spaces between adjacent burner surfaces 5.

In at least some of the apertures 6, with at least one for each of the spaces between adjacent burner surfaces 5, there is provided booster ignition charges 11, which are ignited by a common central ignition charge 10 mounted in the front end of the tube 7.

Thus, ignition of the central ignition charge 10 in turn ignites the booster ignition charges 11 for ignition of the opposed burner surfaces 5 of the propellant charges 12 and 13. With ignition of the burner surfaces 5 of the propellant charges 12, 13, the combustion gases produced thereby will flow radially inwardly through each of the apertures 6 in the direction of the arrow 14 to the center of the gas conducting tube 7 to travel axially therethrough toward and through the nozzle 8. After the booster propellant 1 has been consumed, the combustion will be immediately transferred, in the dual fuel propellant charges, to the remaining sustainer propellant 2. With the long axial thickness of the sustainer propellant, as shown in the drawing, together with the lower burning rate, a corresponding long burning time is achieved with the burner stage for the propulsion unit. Each of the propellant charges is provided with insulation 15, 16 on its cylindrical interior and exterior surfaces, respectively, so that only axial end burning will be permitted.

Further modifications, variations and embodiments are contemplated other than the embodiment shown that has been specifically described for purposes of illustration.

It is claimed:

1. A dual solid fuel propellant rocket engine, comprising: a combustion chamber connected to a nozzle means; a plurality of separate, spaced propellant charges in said combustion chamber and each having burner surfaces; at least one of said propellant charges consisting essentially of booster propellant; and at least another of said propellant charges consisting essentially of booster propellant forming its entire initial burner surface, and sustainer propellant having a slower burning rate than said booster propellant, said sustainer propellant being disposed on the opposite side of the booster propellant associated therewith which is away from said initial burner surface.

2. The engine according to claim 1, wherein said at least one propellant charge is a dual end burner having opposite burner surfaces constituting the total burning surface and said at least another propellant charge is a dual end burner having its sustainer charge disposed between two outer booster charges.

3. The engine according to claim 1, wherein each of said separate propellant charges is an annular-cylindrical grain body having insulating means on its interior cylindrical surface and its exterior cylindrical surface preventing burning on the interior and exterior cylindrical surfaces.

4. The engine according to claim 3, wherein said combustion chamber includes a forward end and a rearward end connected to said nozzle means; a tube centrally disposed in said combustion chamber, extending through said separate propellant charges and having a rearward open end in communication with said nozzle means; said tube having a plurality of radial apertures opening respectively forwardly of each of said separate propellant charges.

5. The engine according to claim 4, a central ignition charge mounted in the forward end of said tube; a plurality of ignition booster charges disposed in at least some of said radial apertures, at least one ignition booster charge being directly associated with each propellant charge burner surface.

6. The rocket engine according to claim 1, including separate means for each of said separate propellant charges individually securing said propellant charges in said combustion chamber.

7. The engine according to claim 6, wherein said separate propellant charges are equally axially spaced with respect to each other.

8. The engine according to claim 1, wherein each of the charges consisting essentially of both booster propellant and sustainer propellant are disposed only at one end of the combustion chamber and the remaining propellant charges consisting essentially of booster propellant are disposed at the other end of said combustion chamber.

9. The engine according to claim 1, wherein each of said propellant charges has the same cross section perpendicular to the central axis of said combustion chamber.

10. The engine according to claim 1, wherein the propellant charges consisting essentially of both booster propellant and sustainer propellant are identical.

11. The engine according to claim 1, wherein the propellant charges consisting essentially of booster propellant are identical.

12. The engine according to claim 1, wherein each of said propellant charges consisting essentially of only booster propellant has dual end opposite burner surfaces and a total thickness; each of the propellant charges consisting essentially of both booster propellant and sustainer propellant has a sustainer propellant disposed between two layers of booster propellant, each layer of which is one half said first mentioned thickness.

13. The engine according to claim 1, wherein each of said separate propellant charges includes an annular radially extending band securely mounted at its center and having an external diameter substantially equal to the internal diameter of said combustion chamber; a plurality of thin wall tubes having an external diameter substantially equal to the external diameter of said annular bands and being disposed respectively between adjacent two annular bands to determine the axial spacing between adjacent or propellant charges.

14. The engine according to claim 1, wherein the ratio of booster total burning surface to sustainer total burning surface after all booster propellant is consumed is about 3 to 1 and the ratio of booster burning rate to sustainer burning rate is about 3 to 1.

15. The engine according to claim 1, wherein said combustion chamber includes a forward end and a rearward end connected to said nozzle means; a tube centrally disposed in said combustion chamber, extending through said separate propellant charges and having a rearward open end in communication with said nozzle means; said tube having a plurality of radial apertures opening respectively forwardly of each of said separate propellant charges.

16. The engine according to claim 15, a central ignition charge mounted in the forward end of said tube; a plurality of ignition booster charges disposed in at least some of said radial apertures, at least one ignition booster charge being directly associated with each propellant charge burner surface.

17. The engine according to claim 1, wherein said separate propellant charges are equally axially spaced with respect to each other.

References Cited

UNITED STATES PATENTS

| | | | |
|---|---|---|---|
| 2,724,237 | 11/1955 | Hickman | 60—250X |
| 3,120,737 | 2/1964 | Holloway | 60—250 |
| 3,128,600 | 4/1964 | Oldham | 60—250 |
| 3,442,084 | 5/1969 | Dilchert et al. | 60—250 |

CARLTON R. CROYLE, Primary Examiner

U.S. Cl. X.R.

60—256